United States Patent [19]
Park et al.

[11] Patent Number: 5,538,823
[45] Date of Patent: Jul. 23, 1996

[54] LIQUID CRYSTAL DEVICE UTILIZING THERMOSTABLE POLYMERIC MATERIAL

[75] Inventors: Woo S. Park; Hyun H. Shin, both of Kyongki-Do; Soon B. Kwon, Seoul, all of Rep. of Korea; Andrey G. Dyadyusha, Kiev, Ukraine; Tatyana Y. Marusii, Kiev, Ukraine; Yuriy A. Reznikov, Kiev, Ukraine; Anatoliy I. Khizhnyak, Kiev, Ukraine; Oleg V. Yaroshchuk, Kiev, Ukraine; Alexandr A. Kolomeytsev, Kiev, Ukraine; Igor V. Gerus, Kiev, Ukraine

[73] Assignees: Goldstar Co., Ltd., Seoul, Rep. of Korea; Institute of Physics, Kiev, Ukraine

[21] Appl. No.: 394,518

[22] Filed: Feb. 27, 1995

Related U.S. Application Data

[62] Division of Ser. No. 82,413, Jun. 28, 1993, abandoned.

[30] Foreign Application Priority Data

May 20, 1993 [KR] Rep. of Korea ............... 93 8698

[51] Int. Cl.$^6$ .................. G02F 1/1337; C09K 19/00
[52] U.S. Cl. .................. 430/20; 430/19; 359/75; 359/77; 359/78
[58] Field of Search ............... 430/20, 19, 962; 428/1; 252/299.01; 359/75, 78, 77; 525/56

[56] References Cited

U.S. PATENT DOCUMENTS

| | | |
|---|---|---|
| 3,933,746 | 1/1976 | Steele . |
| 5,101,011 | 3/1992 | Mikami et al. .............. 430/20 |
| 5,296,321 | 3/1994 | Kawanishi et al. ............ 430/20 |

*Primary Examiner*—Thorl Chea
*Attorney, Agent, or Firm*—Finnegan, Henderson, Farabow, Garrett & Dunner

[57] ABSTRACT

A thermostable orientation material for liquid crystal alignment including a photopolymerized polyvinyl fluorocinnamate.

6 Claims, 1 Drawing Sheet

1

LIQUID CRYSTAL DEVICE UTILIZING THERMOSTABLE POLYMERIC MATERIAL

This is a division of application Ser. No. 08/082,413, filed Jun. 28, 1993, now abandoned.

BACKGROUND OF THE INVENTION

A. Field of the Invention

The present invention relates to a thermostable photopolymeric film for liquid crystal (LC) alignment.

B. Description of the Prior Art

To obtain a monodomain planar orientation for a liquid crystal (LC) cell, several techniques were known. For example, in "Alignment of Nematic Liquid Crystals and Their Mixtures", *J. Cognard*, Gordon & Beach Science Publishers, 1982, it is described that to obtain a uniform liquid crystal orientation, microgrooves are produced on the surface of the substrate by mechanically treating (also known as "rubbing") the polymer surface of the substrate. However, this technique has a disadvantage in that microgrooves inherently have defects, and theses defects are known to cause random phase distortions and light scattering, degrading display characteristics. Further, static electricities generated during the rubbing of the polymer surface are known to cause defects in active matrix displays. Yet further, with this technique, it is practically impossible to locally orient selected regions of the surface, each region with a different orientation.

Another known technique is to fabricate an LC cell orientation film from a copolymer of polyamide (or polyimide) class. Such a copolymer has aliphatic and aromatic (heterocyclic) fragments in the main chain and fluoro-alkyl groups $C_nH_mF_{(2n+1-m)}$ in the side chains, e.g. 3-fluoromethyl group $CF_3$, where n is a natural number and m a natural number of zero (0) or 2n or less. Such a copolymer is described, for example, in a European patent no. EP 0 217 641 A2, Int. $Cl^4$ G 02 F 1/133; C 09 K 19/30, G 02 F 1/137 (1986), published 08.04.87, Bulletin 87/15. However, to make such-a type of a fluoro-alkyl-containing polyamide (or polyimide) orientation film, the substrate surface still has to be rubbed. Therefore, this technique inherently has the above mentioned disadvantages.

Yet another technique is known as described, for example, in *M. Schadt et. al.*, Jpn. J. Appl. Phys., vol. 31, part 1, No 7, pp. 2155–2164 (1992). According to this technique, to fabricate a photopolymeric orientation film, prepolymers were produced by a reaction of a polyvinylalcohol with a substituted cinnamic acid. The methoxy-group was used as a substituent in the para-position of the benzene ring of cinnamic acid molecules. The prepolymers were photopolymerized by irradiating a linearly polarized ultraviolet (UV) light thereon. The photopolymerization of the prepolymer caused a directed cross-linking of polyvinyl-4-methoxy cinnamate (PVCN-M) linear chains to form a new net polymeric structure with a higher order due to a double bond opening reaction in vinyl fragments of cinnamoyl molecules, i.e., 2+2 cycloaddtion reaction.

Such a polymeric orientation film described in *Schadt et al.* possesses an optical anisotropy and is known to be capable of planarly orienting standard LC modecules in an preferred axial direction perpendicular to the UV light polarization vector. However, the main disadvantage of such a photopolymeric orientation film is low thermostability.

It has been experimentally discovered that with this type of polymeric orientation films, if the clearing point T of nematic LC (NLC) in the LC cell is greater than 50° C., distortions in the planar orientation appear when the ambient temperature is approximately 50° C. On the other hand, if the clearing point T of NLC is smaller than 50° C., when the ambient temperature reaches an isotropic phase (i.e., for NLC 5CB, for example, it is about 40° C.), the initial orientation does not resume and a great number of disclinations appear, thus irreversibly distorting liquid crystal orientation.

The operating temperature range of the LC cell trends to increase, the clearing point of the LC in the LC cell consequently increases, for example, up to the temperature of 80° C.~100° C. The LC cell having a photopolymeric film, liquid crystals should be filled into the LC cell at temperatures near the clearing point of the LC, to avoid disclination lines in the LC cell. A conventional photopolymer film which uses PVCN-M as a prepolymer can not withstand such high process and operating temperatures.

SUMMARY OF THE INVENTION

The present invention overcomes the problems of the prior art by providing a new orientation material with a superior thermal stability and suitable for mass production. To achieve the objects and in accordance with the purpose of the invention, as embodied and broadly described herein, the orientation film of the present invention comprises a photopolymerized polyvinyl fluorocinnamate material.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate an embodiment of the invention and together with the description, serve to explain the principles of the invention.

DESCRIPTION OF THE PREFERRED EMBODIMENT

The present invention, as embodied herein, preferably uses a polyvinyl fluorocinnamate (PVCN-F) as a fluorinated prepolymer. To enhance thermostability and facilitate the planarly orientation of the liquid crystal (LC) cell in a desired direction, the prepolymer was photopolymerized by irradiating a linearly polarized ultra-violet (UV) light beam thereon.

More specifically, a new polyvinyl cinnamate derivative containing fluorine atoms in the benzene ring of a cinnamoyl fragment was synthesized. The covalent and Van der Waals radii of a fluorine atom are the smallest and closest to those of hydrogen, i.e., $7.2 \times 10^{-2}$ nm and $13.5 \times 10^{-2}$ nm; $3.7 \times 10^{-2}$ and $12 \times 10^{-2}$ nm, respectively, and therefore, the fluorine atoms introduced into the organic compounds, i.e., substitution of the hydrogen atoms by the fluorine atoms, did not produce appreciable steric hindrance, essentially influencing the chemical properties of molecules.

Due to its electronic nature, fluorine atoms show a high positive resonance (electron donating) effect in conjugate systems, where it can influence the reaction center, i.e., double bond of a cinnamoyl fragment of the fluorinated polyvinyl cinnamate in our case. The value of $\sigma_R$-constant for a fluorine atom, determined from $pK_a$ of benzoic acids, equals to −0.46, and is very close to that of the methoxy group, (i.e., −0.57 under the same conditions). See, for example, "Electronic Nature of Fluorinated Substituent", L. Yagupolsky et al., Uspekhi Khimii, 43, No. 1, pp. 64–94 (1974).

It has been experimentally established that the presence of fluorine atoms in the benzene ring does not hinder the side chain coupled double bond to participate freely in a radical initiated polymerization reaction. See, for example, "Fluorinestryene synthesis and polymerization", D. Antonuzzi, Fluorine Polymers, Moscow, Mir Publishers, 1975, pp. 34–74; and B. Bachman and L. Levis, J. Am. Chem. Soc., vol. 60, No 8, pp. 2022–2025 (1947).

Figure 1:
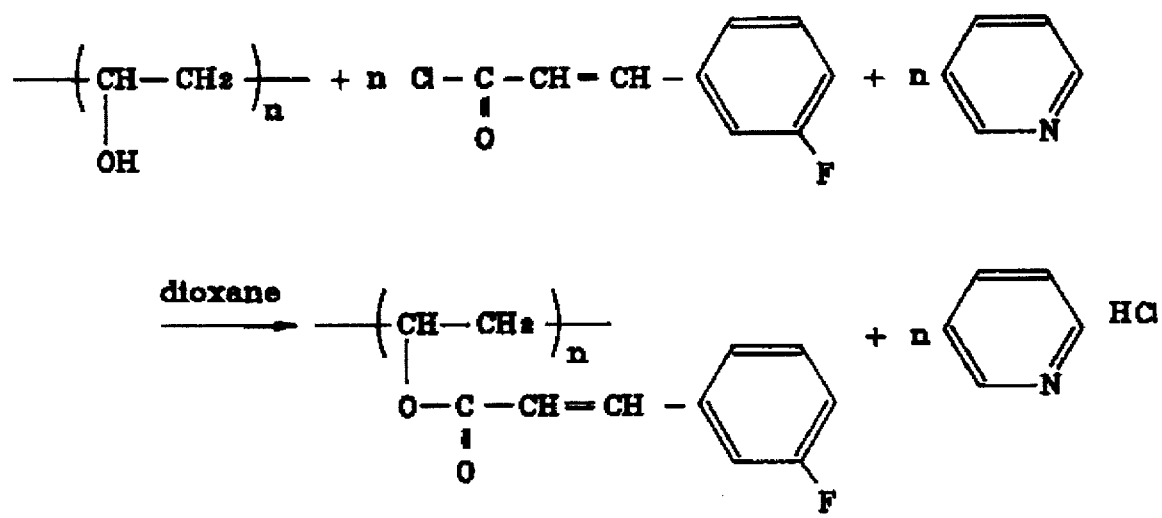
FIG. 1 is a schematic illustration of the formation of a polyvinyl fluorocinnamate (PVCN-F) according to an embodiment of the present invention.

According to the embodiment of the present invention, to enhance thermostability, a polyvinyl fluorocinnamate (PVCN-F) was preferably selected as a prepolymer for photopolymerization. The PVCN-F was synthesized by reaction of a polyvinylalcohol with a 4- or 2- fluorocinnamoyl chloride in a dioxane-pyridine solution. A pyridine was used as a polar solvent and also to act as a base which coupled the hydrogen chloride generated in the reaction. During this process, the substitution of an approximately 95 percent of hydroxy groups in polyvinyl alcohol occurred, shown in FIG. 1. The resulting PVCN-F was educed by diluting a reaction mixture with water, thoroughly washed clean from solvents, salts and chlorides, wrung out and dried in vacuum and then was milled in a vibrating mill.

The polymer orientation film fabrication process, as used in conjunction with the present invention, is further described in three stages below:

a) Polymer solution: A polymer solution was prepared using 1:1 mixture of 1, 2-dichloroethane (DCE) and chlorobenzene (CB) for a low molecular weight PVCN-F and 1:4 mixture of DCE and CB for a higher molecular weight PVCN-F. The polymer concentration was determined by the thickness of a coating (or orientation) layer on each glass substrate. The thickness was measured on Linnik interferometer.

b) Polymer film deposition: An optimum concentration of the PVCN-F solution 4 g/l was selected for coating (or covering) the glass substrate to provide a film thickness of approximately 500 nm. A drop of the PVCN-F solution was placed in the center of the glass substrate using a measuring pipette. The solution was deposited on the glass substrate by centrifuging to constitute an orientation film. The centrifuging lasted for approximately 20–30 seconds at the rotational speed of 3–5× $10^3$ revolutions per minute. The orientation film was prebaked immediately after the centrifuging at the temperature of approximately 50° C. for 30 min.

c) Film illumination and photoresponse measurement: The initially isotropic polymer film became anisotropic when irradiated with a UV polarized light beam having a wavelength $\lambda < 365$ nm. The appearance of anisotropy was indicated by a light induced birefringence $\Delta n = n_e - n_o$, where $n_o$ and $n_e$ are refractive indices for ordinary and extraordinary light waves, respectively.

Figure 2:
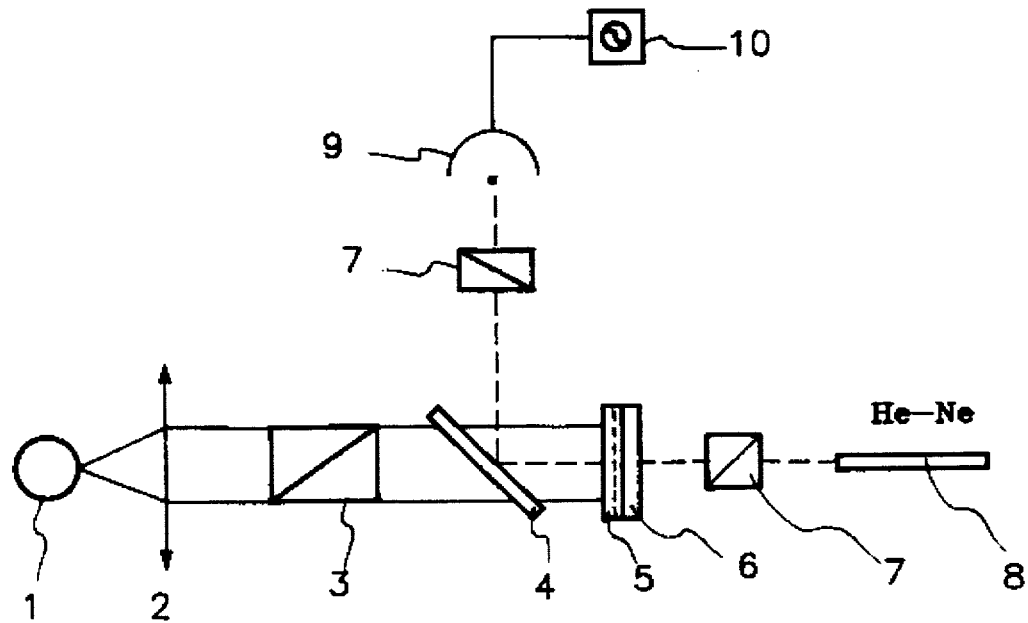
FIG. 2 is a schematic illustration of an experimental set up for fabricating a liquid crystal cell having the polyvinyl fluorocinnamate of FIG. 1 and measuring certain properties thereof.

FIG. 2 shows an experimental set up for fabricating an LC cell according to the embodiment of the present invention. A substrate coated (or covered) with a PVCN-F orientation film was illuminated (or irradiated) with an exposure UV light beam. The induced birefringence was detected during the illumination.

Referring to FIG. 2, the UV light beam was formed by a Hg lamp 1 with an average power of approximately 250–500 W, a lens system 2 and exposed via a polarizing Glan-Thomson prism or thick block of Iceland spar 3, and a splitting mirror 4. The scheme for monitoring birefringence kinetics included a He-Ne testing laser 8, polarizers 7, phtodiodes 9, and digital oscillograph C-9-8 10. Polarizers 7 were crossed with respect to one another, and the UV light E-vector made approximately a 45° angle with the polarizer axis. A PVCN-F film 5 on a glass substrate 6 was exposed to a saturation level of the signal of the monitored optical anisotropy. The exposure time t was dependent on the UV light power density I. For example, the exposure time t was 5–15 min at the power density I of 10 mW/cm$^2$.

The LC cell was preferably sandwiched between two glass substrates. Each of the two substrates is coated (or covered) with an illuminated (or photopolymerized) PVCN-F film, and the two coated substrates were assembled using a commonly used assembly technique in such a manner that the PVCN-F coated surfaces of the two substrate face one another. Then LC materials were filled into the gap between the coated surfaces of the substrates by capillary effect at room temperature. The PVCN-F film in the LC cell fabricated as above provided a high quality planar and 90° twist alignment with a negligibly small pretilt angle and a strong polar anchoring energy. Further, optical and electrooptical characteristics of the planar and twist PVCN-F film made such a PVCN-F film suitable for LC alignment.

The LC cell formed between the substrates covered with the fluorine substituted prepolymer were experimentally proven to be superior in thermostability to those which has been described in earlier publications. See example, M. Schadt et. al., Jpn. J. Appl. Phys., vol. 31, part 1, No 7, pp. 2155–2164 (1992) where polyvinyl-4-methoxy cinnamate (PVCN-M) was used as a photopolymerized prepolymer.

According to the embodiment of the present invention, thermostability was measured by visually observing the quality of cell alignment under the crossed polarizer, and also by measuring the voltage of $V_{10}$ and a ratio $g = V_{10}/V_{90}$ after several cycles of heating-cooling cycles. The twisted PVCN-F film was tested on an automatic experimental set up normally used for measuring electrooptic characteristics of the LC cell.

The thermostabilizing furnace system used in the experiment provided the accuracy in measuring temperature stabilization within the tolerance of not greater than 0.5° C. The voltage on the cell electrodes was increased incrementally with a regulated increment using a special computer program. This special computer program coordinated with another program which monitored the variations in the light transmission of the LC cell when a given voltage was applied to the LC cell at a given temperature.

It was observed that when the substrate having a polyvinyl 4-methoxy cinnamate (PVCN-M) orientation film was heated to the temperature of 50°–55° C. and subsequently cooled to room temperature, disclinations appeared. Further, the electrooptical transition threshold irreversibly increased, and the contrast parameter g decreased by 25–40%. In contrast, when the substrate having an orientation film of photopolymerized polyvinyl fluorocinnamate was tested, these orientating characteristics were not altered even after the substrate had been subject to the temperature of 90° C. for 24 hours.

Several different types of polyvinyl fluorocinnamate prepolymers may be obtained from different initial polyvinylalcohol molecular masses. It was found that to obtain high thermostability, the polyvinylalcohol molecular mass of these types of prepolymers was preferably not less than 15,000.

The preferred embodiment of the present invention will now be further described with reference to specific examples. It should be understood that these examples are intended to be illustrative only and the present invention was not limited to the conditions, materials or devices recited therein. All parts and percentages recited are by weight unless otherwise specified.

EXAMPLE 1

Polyvinyl-4-fluorocinnamate synthesis

A mixture of 22 g of polyvinylalcohol (Fluka, mol. mass 72,000) and 350 ml of anhydrous pyridine was stirred for approximately 8 hours at the temperature of approximately 45°–50° C. The mixture was then retained for approximately 24 hours at room temperature. Then, the mixture was stirred at the temperature of approximately 20°–25° C. and a solution of 111 g of 4-fluoro-trans-cinnamoyl chloride in 500 ml of anhydrous dioxane was gradually added thereto.

After the 4-fluoro-trans-cinnamoyl chloride was added, the mixture was continuously stirred until a homogeneous suspension was obtained. Then, the suspension was retained for approximately 12 hours. A reacting mass, while being stirred, was slowly poured onto five (5)l of cold water in a vessel. The polyvinyl fluorocinnamate viscous mass fallen out of the vessel was thoroughly washed with water until the pyridinium salt disappeared. During this washing, the reaction mass was gradually solidified.

Then, the reaction mass was filtered out and thoroughly wrung out of water. Thereafter, the polyvinyl fluorocinnamate was dried in a vacuum at the temperature of approximately 35°–40° C. until a constant weight was obtained, and subsequently milled in a vibrating mill. The final product was approximately 79.2–83.7 g (87–92% in weight percent). The calculation made on the basis of element analysis data showed that the extent of hydroxy groups of polyvinylalcohol macromolecule acylation was 95±/–2% in weight percent.

By weight percent: C 67.14, 67.37; H 4.95, 5.11; F 9.00, 9.10.

As calculated for the structure (n=1635±/–20):

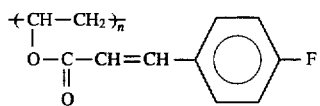

By weight percent: C 68.75; H 4.69; F 9.89 $^{19}$F-NMR spectra (Bruker WP 200, CDCl$_3$ solvent, ethanol-CCl$_3$F): singlet at 110 md

IR Spectrum (spectrometer VR-20, KBr tablet), v, cm$^{-1}$: 1710 (C=O); 1230–1240 (C—O—C); 1170 (Ar—F); 1635 (—CH=CH—); 3400–3600 (slightly broadened vibration band of a free and hydrogen bonded hydroxy group)

EXAMPLE 2

Polyvinyl-2-fluorocinnamate synthesis

This second exemplary process is analogous to the first exemplary process described in EXAMPLE 1 except that a 2-fluoro-trans-cinnamic acid was used as a reaction component instead of the 4-fluoro-trans-cinnamic acid.

It was determined in weight percent as (%): C 66.58, 66.72; H 4.72, 4.85; F 8.79, 8.93.

Calculated for the

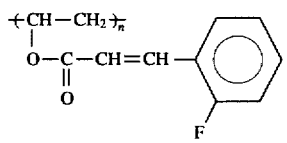

Structure as (%); C 68.75; H 4.69; F 9.89.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal device, comprising:
   a first substrate having a first major surface;
   a second substrate having a second major surface facing said first major surface and spaced therefrom;
   a layer of liquid crystals disposed between said first and second major surfaces, each of said first and second major surfaces being at least partially covered with a polyvinyl fluorocinnamate.

2. The liquid crystal device of claim 1, wherein said polyvinyl fluorocinnamate is derived from a polyvinyl alcohol and a fluorocinnamoyl group.

3. A liquid crystal device, comprising:
   a first substrate;
   a first orientation film comprising a polyvinyl fluorocinnamate on the first substrate;
   a second orientation film comprising a polyvinyl fluorocinnamate on the first orientation film;
   a second substrate on the second orientation film; and
   a layer of liquid crystals disposed between the first orientation film and the second orientation film,
   wherein the first orientation film and the second orientation film orient the liquid crystals in a desired direction.

4. The liquid crystal device of claim 3, wherein the polyvinyl fluorocinnamate is derived from a polyvinyl alcohol and a fluorocinnamoyl group.

5. The liquid crystal device of claim 3, wherein the first orientation film and the second orientation film maintain a stable orientation of the liquid crystals after experiencing a temperature equal to or greater than a clearing point.

6. The liquid crystal device of claim 1, wherein the polyvinyl fluorocinnamate maintains a stable orientation of the liquid crystals after experiencing a temperature equal to or greater than a clearing point.

* * * * *